United States Patent [19]
Fike

[11] Patent Number: 6,086,811
[45] Date of Patent: Jul. 11, 2000

[54] MOLDING SYSTEM FOR RUBBER TRACTOR TRACKS

[75] Inventor: Louis T. Fike, Los Angeles, Calif.

[73] Assignee: The Goodyear Tire & Rubber Company, Akron, Ohio

[21] Appl. No.: 09/069,269

[22] Filed: Apr. 29, 1998

[51] Int. Cl.⁷ .................................................. B29C 35/00
[52] U.S. Cl. ...................... 264/271.1; 156/117; 156/124; 156/140; 156/141; 264/326; 425/34.2; 425/394
[58] Field of Search ............................... 425/31, 32, 34.2, 425/28.1, 394, 395, 403; 264/271.1, 326; 156/133, 140, 141, 117, 124, 137

[56] References Cited

U.S. PATENT DOCUMENTS

| | | |
|---|---|---|
| 1,579,922 | 4/1926 | Gammeter . |
| 1,665,870 | 4/1928 | Wetmore . |
| 1,715,973 | 6/1929 | Abbott . |
| 1,763,589 | 6/1930 | Kirk . |
| 1,779,376 | 10/1930 | Swern . |
| 1,779,377 | 10/1930 | Swern . |
| 1,949,443 | 3/1934 | Abbott . |
| 1,986,092 | 1/1935 | Abbott . |
| 2,747,225 | 6/1956 | Zona . |
| 3,222,716 | 12/1965 | Harris . |
| 3,791,897 | 2/1974 | Mesly . |
| 3,932,256 | 1/1976 | Touchette ................................. 156/133 |
| 3,934,968 | 1/1976 | Cicognani . |
| 4,003,686 | 1/1977 | McLeod et al. . |
| 4,038,001 | 7/1977 | Stinnes . |
| 4,184,822 | 1/1980 | Schwabauer . |
| 4,207,052 | 6/1980 | Satzler . |
| 4,510,113 | 4/1985 | Takano et al. . |
| 4,575,438 | 3/1986 | Fike . |
| 5,104,600 | 4/1992 | Remond . |
| 5,204,036 | 4/1993 | MacMillan . |
| 5,207,849 | 5/1993 | Siegenthaler . |
| 5,271,727 | 12/1993 | Irie . |
| 5,290,376 | 3/1994 | Siegenthaler ............................. 264/326 |
| 5,346,663 | 9/1994 | Siegenthaler . |
| 5,460,771 | 10/1995 | Mitchell et al. . |
| 5,536,464 | 7/1996 | Muramatsu ............................ 425/34.2 |
| 5,888,330 | 3/1999 | Onaka et al. ........................... 156/140 |

FOREIGN PATENT DOCUMENTS

| | | |
|---|---|---|
| 0 419 424 A2 | 8/1990 | European Pat. Off. . |
| 2 053 786 A | 7/1979 | United Kingdom . |
| WO 91/04145 | 4/1991 | WIPO . |

OTHER PUBLICATIONS

Publication entitled "Ohio Machine's Compression–Cure" advertising brochure (1972).

Primary Examiner—Mathieu D. Vargot
Attorney, Agent, or Firm—Fulwriter Patton Lee & Utecht, LLP

[57] ABSTRACT

A system for molding an endless tractor track by wrapping uncured rubber, calendered cord and wire cable onto the rim of a building and curing drum, positioning the drum within a curing mold, withdrawing the drum from the mold, chilling the drum and then separating the parts of the drum to remove the completed tractor track.

22 Claims, 9 Drawing Sheets

MOLDING SYSTEM FOR RUBBER TRACTOR TRACKS

BACKGROUND OF THE INVENTION

1. Field of the Invention

The present invention relates generally to the molding of vehicle supporting elements formed of rubber and more particularly, to a system for molding rubber tractor tracks in an endless configuration.

2. Description of the Prior Art

Molded rubber tire tracks are in many cases being substituted for conventional metal tractor tracks. Rubber tractor tracks offer better maneuverability, better ride quality in rough fields, better flotation in wet fields, improved side hill stability, excellent traction, low maintenance and versatility compared to steel tractor tracks. Additionally, rubber tracks are replacing conventional rubber tires on tractor and other agricultural vehicles such as combines, trenchers, snow removers, spreaders, sprayers, wagons and carts, since rubber tracks are more friendly to agricultural fields, offer better flotation and less compaction than rubber tires, resulting in better crop yield. The use of rubber tractor tracks permits farmers to get out into the fields earlier in the planting season and plant more crops as compared to rubber tire-equipped agricultural vehicles.

Rubber tractor tracks are defined by an endless rubber belt reinforced with continuous flexible steel cables bonded into the rubber. Presently, a complete rubber tractor track is molded flat in quarter sections which are sequentially then bonded together during the curing process. In practice, the joint between the bonded-together sections tend to break in use. Additionally, the joint between the bonded-together ends is of a different cross-sectional dimension than the cross-sectional dimension of the major portion of the track length. Accordingly, during movement of the track-supported vehicle, the vehicle is subject to severe vibrations. Such vibrations are not only harmful to the vehicle, but also to pavement over which the vehicle is moved. Additionally, such vibration is annoying to the vehicle operator.

Another method involves building a complete track using a drum. Uncured or cured lugs are first manually clamped within pockets formed in drum. Next, uncured rubber, calendered cord and wire cable are wrapped around the outside of the drum. Preformed uncured treads are then attached onto the uncured rubber. The drum is then disposed within an autoclave to cure the rubber and the parts attached thereto. The drum is then collapsed to remove the completed track. Since only low pressure can be applied the cured rubber is of a low density with resulting low strength. Also, the track lugs and treads are not generally integrally bonded to the rubber and are displaced during use.

SUMMARY OF THE INVENTION

The molding system for rubber tire tracks of the present invention effects complete molding of an entire rubber track in an endless configuration of uniform thickness so as to eliminate any discontinuity in cross-section along the length of the rubber track. As a result, a rubber track embodying the present invention eliminates the vibration created when the bonded-together sections of a conventional rubber track during vehicle movement. Additionally, a rubber track embodying the present invention is not subject to breakage as in the case of a conventional rubber track formed of bonded-together sections. Moreover, a rubber tractor track made in accordance with the present invention is completely integral with respect to the lugs and treads whereby the lugs and treads will not become separated from the track.

Another advantage of the molding system for rubber tire tracks embodying the present invention is the reduction in manufacturing time and cost afforded by such system.

These and other features and advantages of the present invention will become apparent from the following detailed description of a preferred embodiment which, taken in conjunction with the accompanying drawings, illustrates by way of example the principles of the invention.

DETAILED DESCRIPTION A PREFERRED EMBODIMENT

Figure 15:
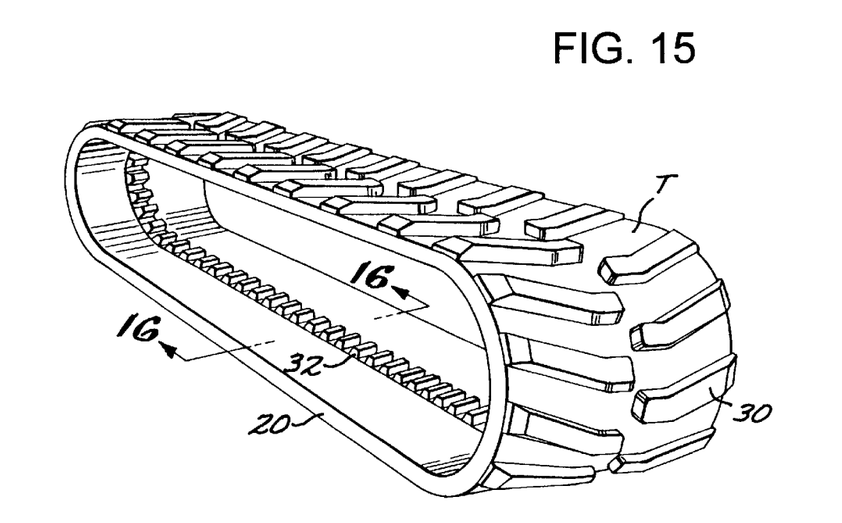
FIG. 15 is a perspective view showing a completed rubber track made in accordance with the system of the present invention.
Figure 16:
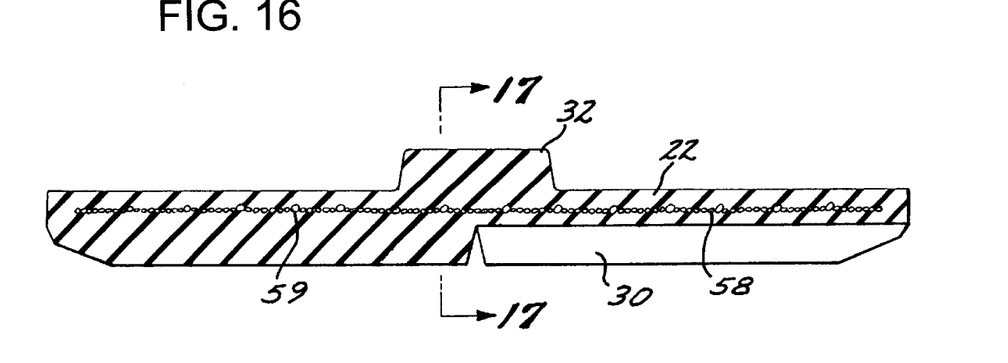
FIG. 16 is a vertical sectional view taken in enlarged scale of 16—16 of FIG. 15.
Figure 17:
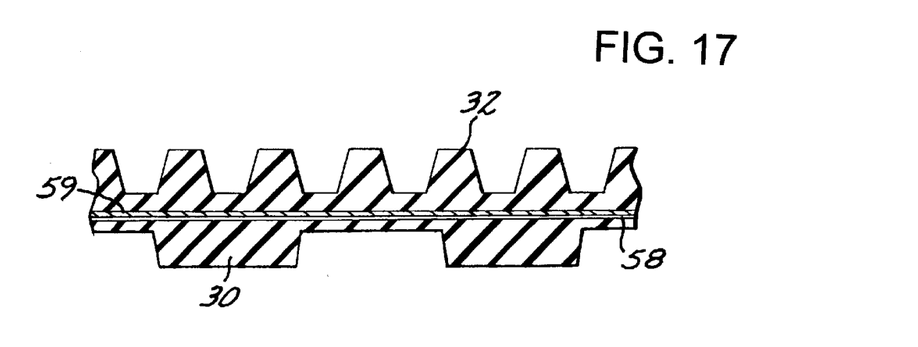
FIG. 17 is a broken vertical sectional view taken along line 17—17 of FIG. 16.

Referring to the drawings, in FIGS. 15, 16 and 17 there is shown rubber tractor track T made in accordance with the apparatus and the method of the present invention. Such track T comprises an endless band 20 formed of rubber 22 and calendered cord and wire cable. It will be understood that such track T is adapted to be positioned upon the wheels or rollers (not shown) of a motorized vehicle such as a tractor, or the like to support such vehicle for movement along a desired surface such as an agricultural field. The exterior peripheral surface of band 20 is formed with integral treads 30. The mid-portion of the interior peripheral surface of band 20 is formed with a plurality of conventional drive or guide lugs 32 which engage complementary sprockets (not shown) on the wheels or rollers of the vehicle which is supported by track T.

Figure 1:
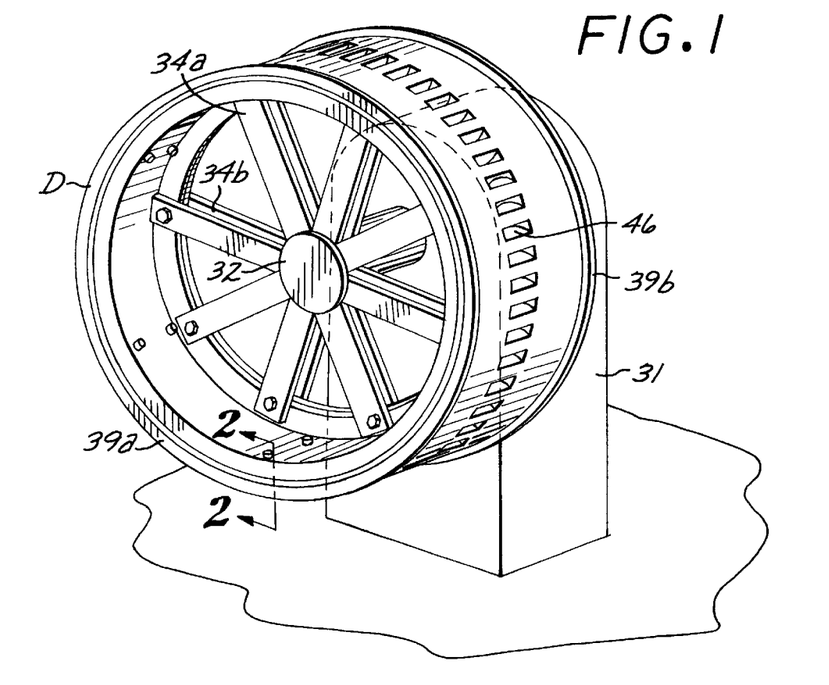
FIG. 1 is a perspective view showing a building and curing drum forming a part of the rubber track molding system of the present invention.
Figure 2:
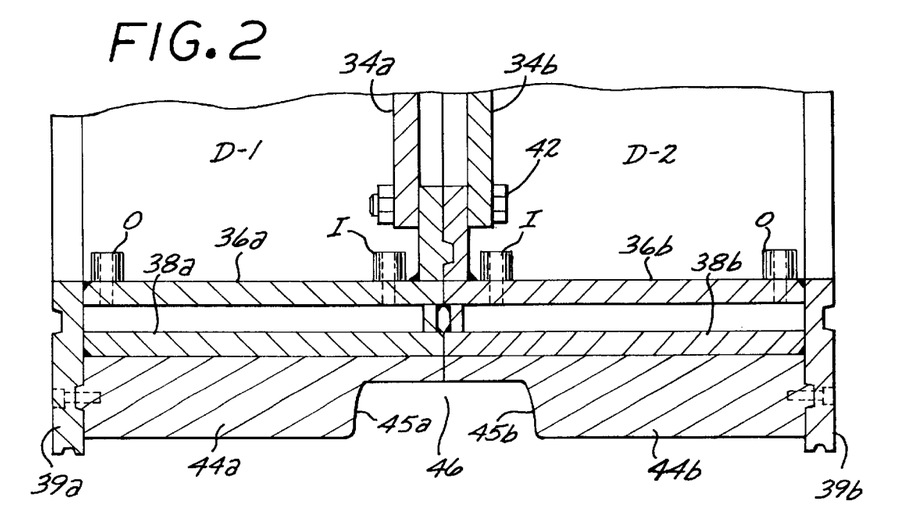
FIG. 2 is a vertical cross-sectional view taken in enlarged scale along line 2—2- of FIG. 1.
Figures 3, 4, 5:
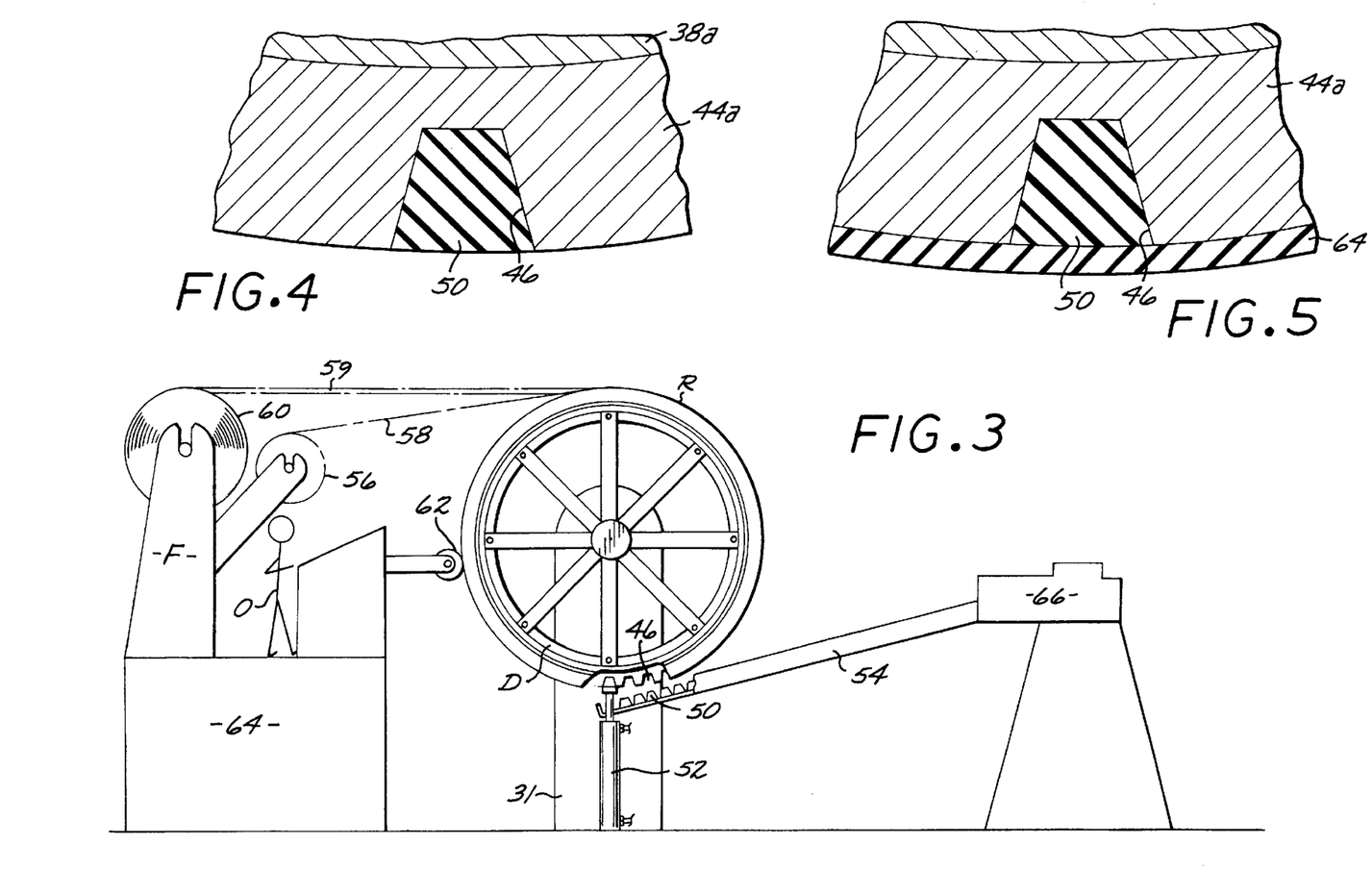
FIG. 3 is a side elevational view showing the drum of FIG. 1 during operation.
FIGS. 4–7 shown successive steps utilized in rubber track molding system of the present invention to deposit uncured rubber, calendered cord and wire cable on the rim of the drum.

Track T of FIGS. 15, 16 and 17 is formed by the apparatus shown in FIGS. 1–14. Referring to FIGS. 1–3, such apparatus includes rotatable building and curing drum D which is utilized with mold M shown generally in FIGS. 9–12 to form a completed rubber tractor track T.

Building and curing drum D is preferably formed of a material which is rapidly responsive to thermal changes, such as aluminum. Drum D is rotatably mounted upon a pedestal 31 by means of a horizontal axle 32. Axle 32 is rigidly connected to Drum D by a plurality of pairs of aligned spokes 34a and 34b. As indicated particularly in FIG. 2, drum D consists of two mirror image halves D-1 and D-2 so as to be horizontally separable. Each drum includes an arcuate inner shell having halves designated 36a and 36b, and an arcuate outer shell, the halves of which are designated 38a and 38b. These concentric shells have their outer ends welded to a pair of coaxial rings 39a and 39b. The inner portions of the inner shells are welded to spoke mounting flanges 40a and 40b. These flanges receive bolt and nut combinations 42 or other attaching means which extend through the outer end of spokes 34a and 34b. The outer peripherary of the outer shells define a rim R having halves designated 44a and 44b. The mid-portion of such rim halves are formed with cavities 45a and 45b which define facing lug pockets 46. The rim R defines and inner matrix which cooperates with an outer matrix formed in the mold M in a manner described hereinafter.

Referring again to FIG. 3, the lug pockets 46 successively receive rubber lugs 50 by means of a conventional power-operated vertically reciprocating ram 52 positioned below the periphery of drum D. A supply of warm lugs is provided by a downwardly inclined chute 54 which successively deposits lugs at a position above the ram 52 in order that upward movement of the ram will force the drive lugs into the drive lug pockets 46. The drum rim R sequentially receives one or more layers of uncured rubber R and conventional calendered cord 58 from one or more supply reels 56 rotatably supported on a frame F positioned adjacent drum D. The rim R of drum D also receives wire cable 59 from a second supply reel 60 carried by frame F adjacent supply reel 56. The frame also includes a sticher pressure roller 62 which exerts radially inwardly directed force against uncured rubber and calendered cord during rotation of drum D. An operator O positioned at a console 64, controls operation of the drum, the supply reels, ram 52 and a drive lug feeder 66 for chute 54.

Figure 6:
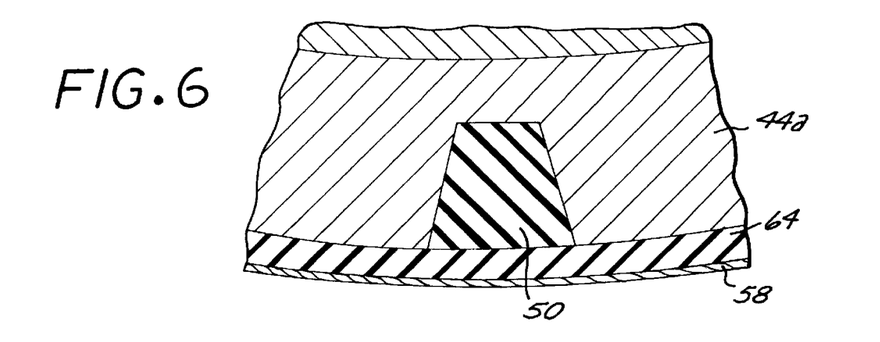
Figure 7:
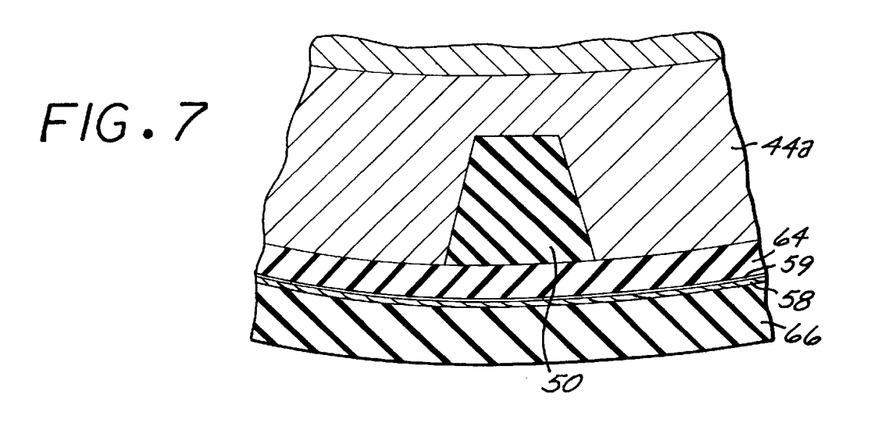
Figure 8:
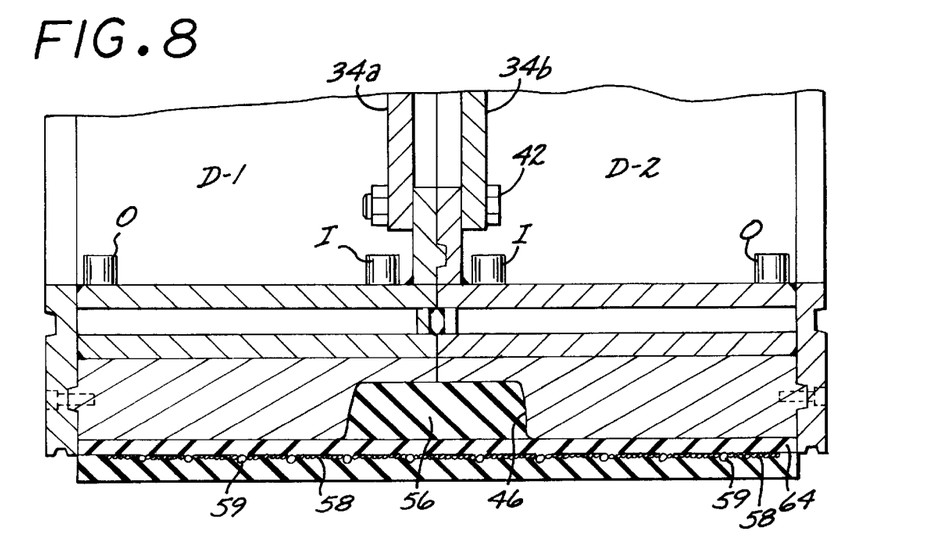
FIG. 8 is a cross-sectional view similar to FIG. 2 after uncured rubber, calendered cord and wire cable has been deposited upon the rim of the building and curing drum.

Referring additionally to FIGS. 4–8, in the operation of the drum D drive lugs 50 will be heated to a soft condition so as to conform to the pockets and remain secured within drive lug pockets 46 after insertion of the drive lugs into the pockets by ram 52. This step is indicated in FIG. 4. In FIG. 5, a first layer of uncured rubber 64 is shown being wrapped around the rim R of drum D. Referring to FIG. 6, after the first layer 64 of uncured rubber has been deposited on the rim R of drum D, a layer of calendered cord 58 will be wrapped about such rim over the layer of uncured rubber. Next, wire cables 59 will be wrapped about rim R. In FIG. 7, a second layer 66 of uncured rubber is shown after having been wrapped about the drum rim over the calendered cord 58 and wire cable 59. It should be understood that the number of layers of uncured rubber, calendered cord and wire cable can be varied to suit the specifications of a particular track manufacturer. In FIG. 8, the appearance of the drive lugs, uncured rubber layers, calendered cord and wire cables is shown. At this point, the uncured rubber and calendered cord will be ready for curing within mold M.

Figure 9:
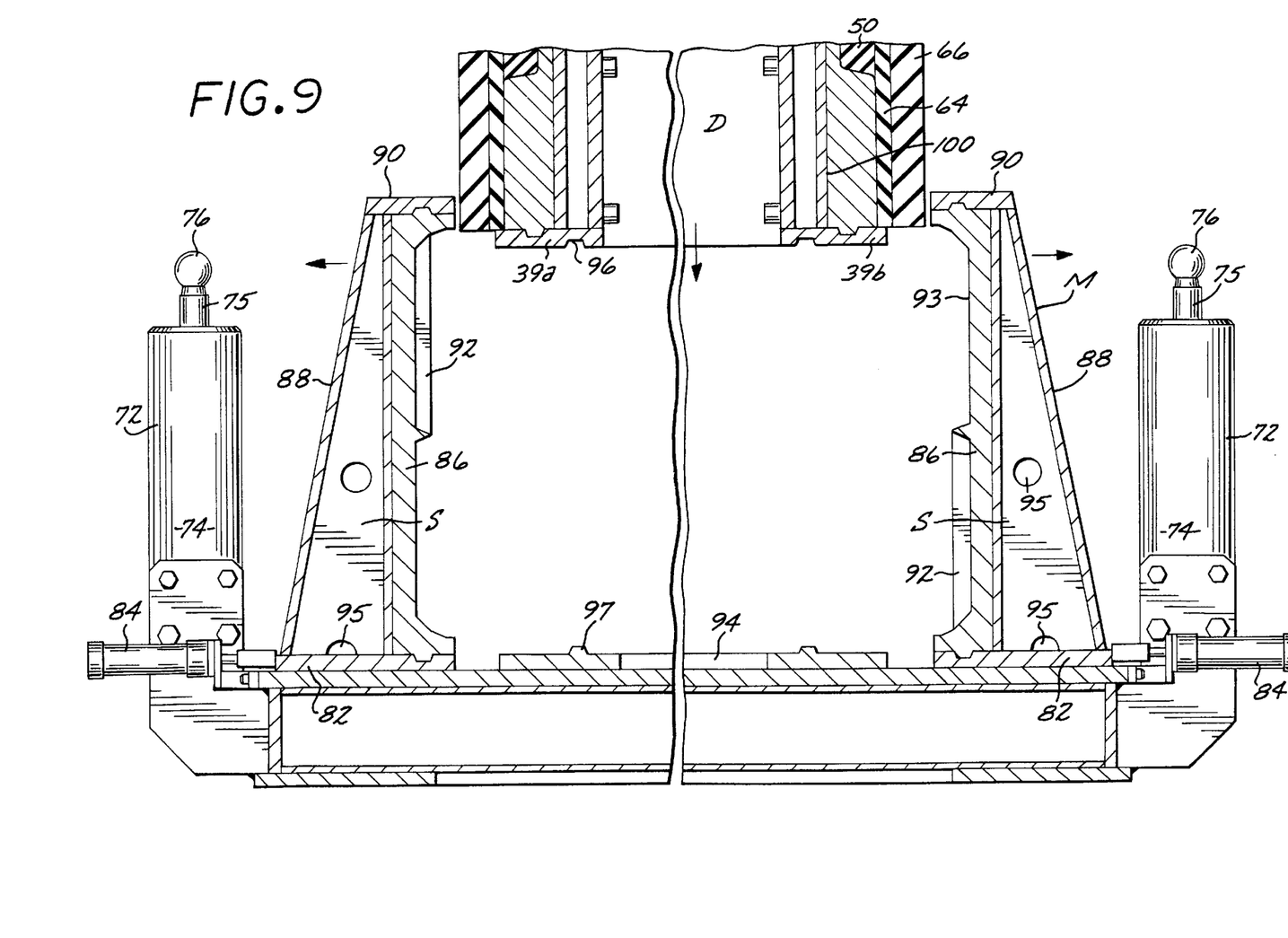
FIG. 9 is a broken side cross-sectional view of a mold that receives the building and curing drum with the parts of such mold being retracted to receive the drum.
Figure 10:
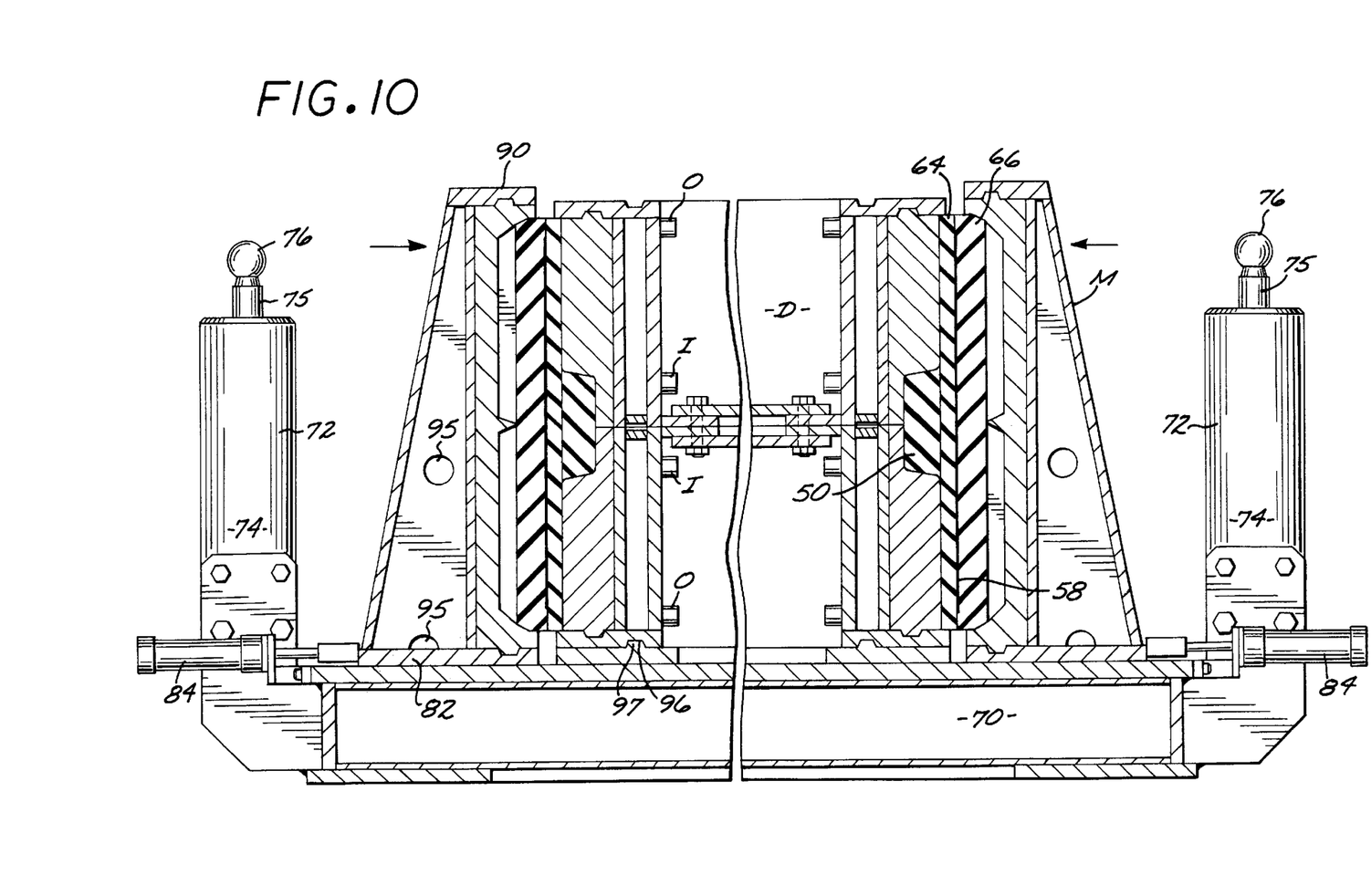
FIG. 10 is a view similar to FIG. 9 showing the drum lowered into the mold.
Figure 11:
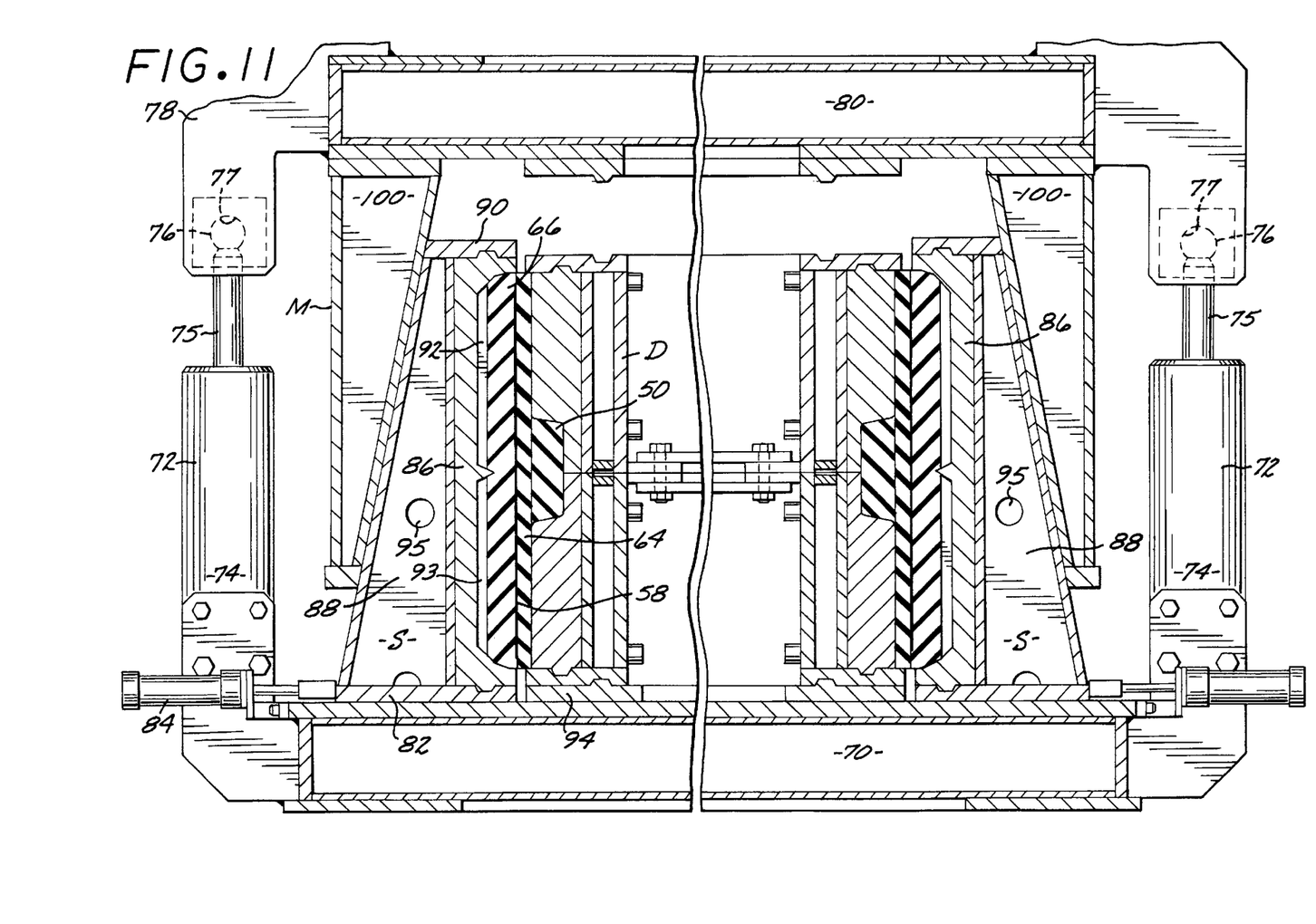
FIG. 11 is a view similar to FIGS. 9 and 10 showing the operation of the mold in forming and compressing the uncured rubber.

Referring now to FIGS. 9–12, mold M includes a base 70 provided at its outer periphery with a plurality of vertically extending hydraulic rams 72 of conventional construction. Each ram includes a cylinder 74 which effects vertical reciprocal movement of a plunger 75 formed at its upper end with a ball 76. Referring to FIG. 11, the balls 76 are received by complementary socket 77 formed in circumferentially spaced brackets 78 supported by the outer periphery of mold top 80. With continued reference to FIG. 9 mold base 70 horizontally, slidably supports a plurality of like outer mold segments S. Each mold segment includes a bottom ring 82 which is slidably supported upon the upper portion of mold base 70 for horizontal reciprocal movement relative to such mold base under the influence of a plurality of horizontally disposed conventional hydraulic or air-actuated cylinder and piston units 84. The mold segments include an outer matrix 86 encompassed by an upwardly tapered hollow heating cone 88. A segmented top ring 90 is disposed over the upper ends of the outer matrices 86 and the cones 88. The inwardly facing surfaces of the outer matrices 86 are formed with tread-forming complementary ribs 92 and grooves 93. A stop ring 94 is secured to the upper surface of mold base B to limit the radially inward movement of the mold segments S. Cones 88 are formed with steam passage apertures 95 connected to a source of steam (not shown) or other heating means in a conventional manner.

Drum inner shells 36a and 36b are provided with fluid inlet I and outlet pipes O to selectively connect the space between the inner and outer shells with steam or other heating medium and/or chilled water. Steam is admitted into such space after the drum D is lowered into mold M and the mold is closed so as to heat rim 44a and 44b. The drum rim R acts as an inner matrix during curing of the rubber, as explained below.

Figure 12:
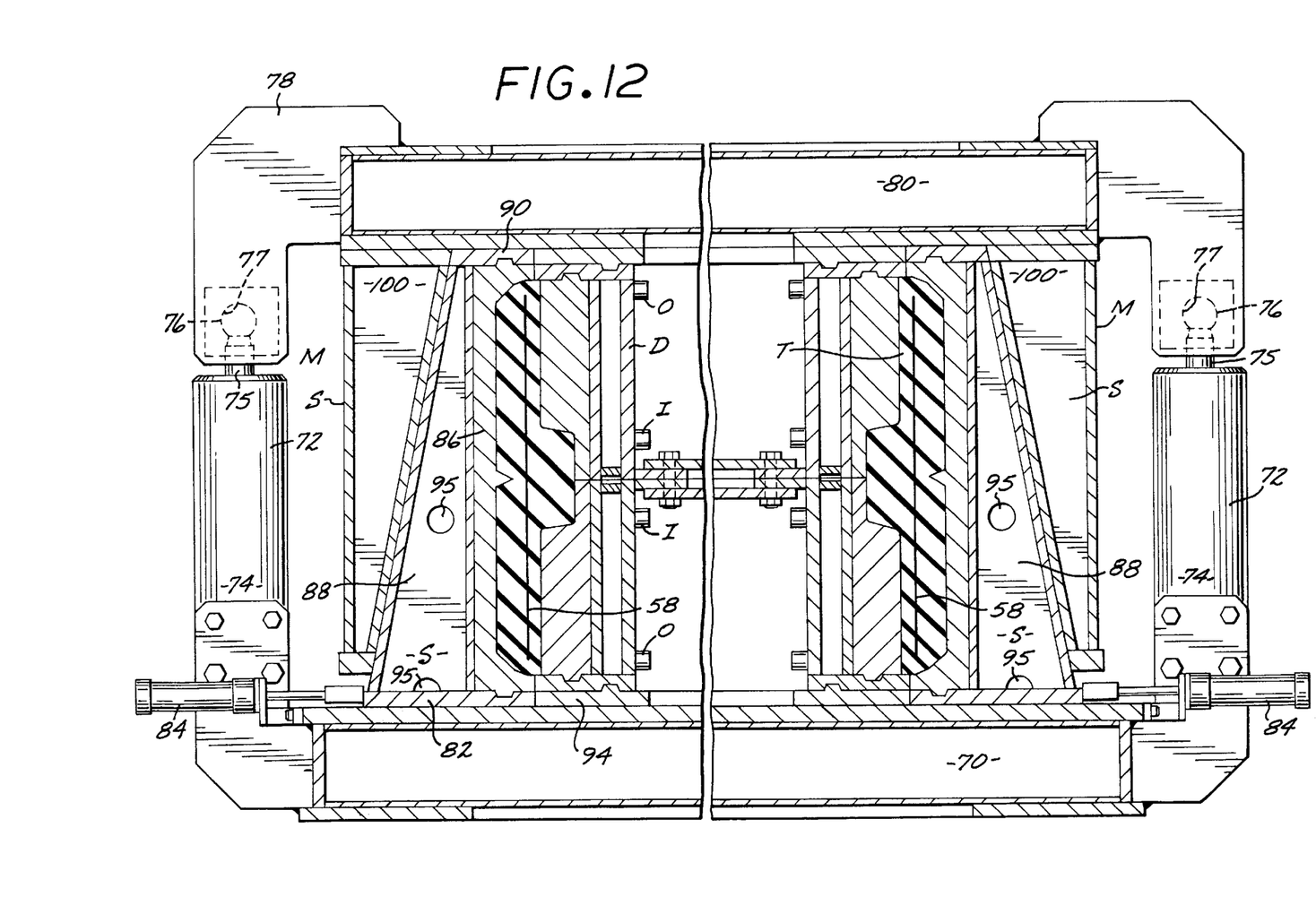
FIG. 12 is a view similar to FIGS. 9, 10 and 11 showing the parts of the mold during curing of the rubber tractor track.

In FIG. 9, the building and curing drum D is shown being lowered within the mold M segments S, with such segments being retracted to their radially outermost position by means of cylinder and piston units 84. Raising and lowering of drum D is effected by a conventional hoist (not shown). Grooves 96 on drum ring 39a engages ribs 97 on locking ring 94 to center the drum relative to the cavity of mold M. In FIG. 10, the drum D is shown positioned within mold M for a rubber curing operation and at this time connected to a heating source after which the mold segments are being advanced radially inwardly towards the drum D. At this time, the mold segments S are already heated. Referring to FIG. 11, the mold top 80 has been connected to the balls 76 of the rams 77 by suitable locking means (not shown) for downward movement of the mold top and locking of such top onto the body of the mold. The underside of mold top 80 is provided with a circular pressure cone 100, the inner surfaces of which slidably engage the outer surfaces of mold segment cones 88 as the mold top 80 is pulled downwardly by rams 72. In FIG. 12, the mold top 80 is shown after it has been pulled downwardly to its lowermost position and held therein. During such downward movement the cones 88 of the mold top slide along the outer surfaces of the cones 88 so as to urge the mold segment cones 88 and their outer matrices 86 into contact with the uncured body of rubber 66 carried by the rim R of drum D. It has been found that the angle of the engaging surfaces of the inner and outer cones may approximate 8° in order to effect the desired compressing action of the matrices against the uncured rubber without the inner and outer cones locking together as the outer cones advance over the inner cones.

With continued reference to FIG. 12, steam is now admitted into the drum D of the in a conventional manner so as to heat the rim inner matrices to a rubber curing temperature. Such steam heat in combination with the heating of the rubber by the outer matrices 86, and by compression of the rubber under the influence of the radially inwardly directed camming effect of the cones 88 and 100 serves to thoroughly cure and compress the bands of uncured rubber on the rim R from the inside to outside of the body of rubber. It should be understood that heating of the drum rim and the mold matrices effects thermal expansion of the drum rim inner matrices and mold outer matrices toward one another so as to supplement the compression provided by the camming effect of the cones. Curing of the rubber also bonds the calendered cord and wire cables to such rubber, and additionally effects bonding of the drive lugs 50 to the main body of the uncured rubber. During curing of the rubber, the ribs 92 and recesses 93 of the outer matrices S will form the treads 30 on the outer periphery of the cured and molded rubber. In this manner, a completely integral rubber track is formed whereby the lugs 50 an track 30 will not separate from the track during vehicle movement.

Figure 13:
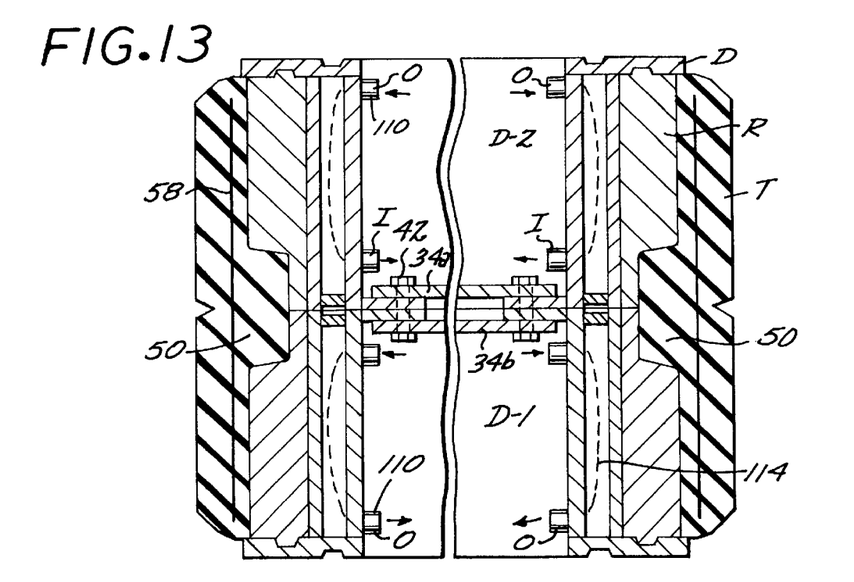
FIG. 13 is a broken side cross-sectional view of the drum and the molded rubber track after the drum has been withdrawn from the mold.
Figure 14:
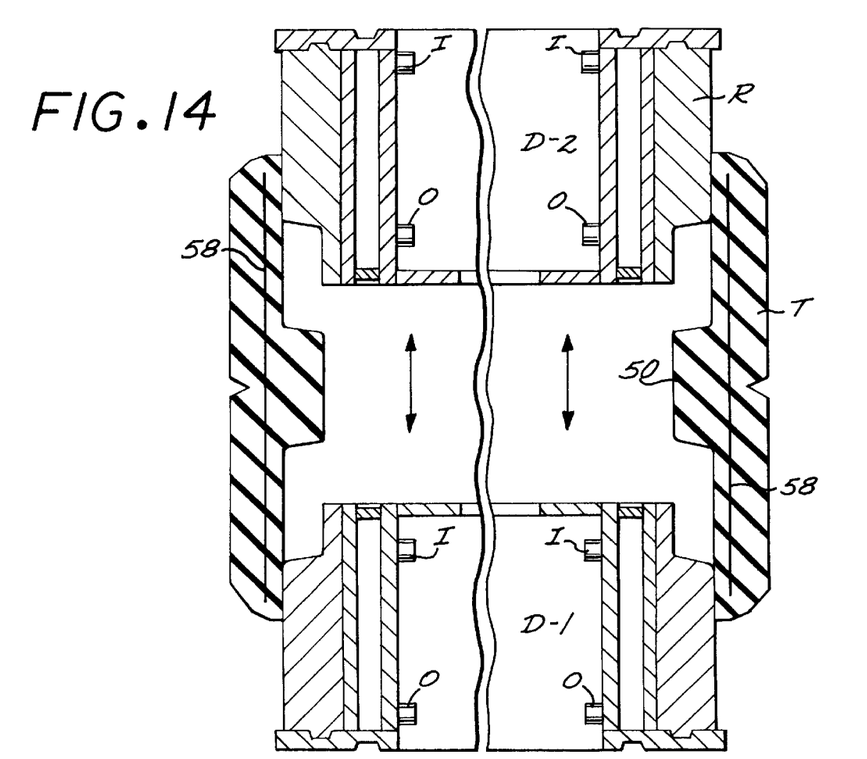
FIG. 14 is a view similar to FIG. 13 showing the parts of the drum being separated for removal of a completed rubber track from such mold.

Referring now to FIGS. 13 and 14, after the rubber has been cured, and the heat source disconnected from the drum D, the mold top 80 removed, cylinder and piston units 84 are actuated to separate the mold segments, drum D and its completed track T will then be raised out of mold M. Thereafter, bolt and nut combinations 42 will be removed from the outer portion of spokes 34a and 34b in order than the drum halves D-1 and D-2 may be axially separated. Such separation will effect release of the completed rubber track T from the drums. In order to facilitate release of the completed track T from the drum halves which define the drum rim, the drum halves will receive chilled water through pipes I and O, before the halves are axially separated. Such chilled water in the space 114 defined between the inner and outer shells 36a, 36b and 38a, 38b thermally contracts the drum rim R.

The aforedescribed apparatus and method will produce an endless rubber tractor track of uniform cross-section which eliminates excessive vibration and remains integral during use over a long service life. Production of such rubber tractor tracks can be accomplished in a minimum amount of time and at a comparative low cost compared to existing rubber track making systems.

While a particular form of the invention has been illustrated and described, it will also be apparent to those skilled in the art that various modifications can be made without departing from the spirit and scope of the invention. Accordingly, it is not intended that the invention be limited except by the appended claims.

What is claimed is:

1. Apparatus for molding an endless tractor track from a band of uncured rubber, calendered cord and wire cable, and a plurality of drive lugs, such apparatus comprising:

a rotatable building and curing drum having a rim formed with a continuous outer peripheral surface that defines an inner rubber molding matrix, such drum also being formed with a plurality of peripherally spaced drive lug cavities which releasably receive the drive lugs;

means to feed drive lugs into the drive lug cavities;

supply reels to dispose uncured rubber, calendered cord and wire cable onto the outer peripheral surface of the drum rim over the drive lugs;

a mold that removably receives the drum and the uncured rubber, calendered cord, wire cable, and drive lugs, the mold having a plurality of tread forming outer rubber molding matrices that are extended to admit the drum and retracted to release the drum;

means for heating the outer matrices and the outer peripheral surface of the drum rim;

power-operated means for advancing the heated outer matrices into compressive contact with the uncured rubber, cord and wire cable between the heated drum rim, and the outer matrices whereby the rubber is cured thereby bonding the calendered cord, wire cable and drive lugs to the rubber and concurrently molding integral treads on the outer surface of the rubber so as to form the cured endless, tractor track; and means to introduce a chilled fluid into the rim of the drum to reduce the rim diameter by thermal contraction so as to free the cured tractor track from the drum.

2. Apparatus for molding an endless tractor track as set forth in claim 1 wherein, the drum is of axially separable construction to effect removal of the cured tractor track from the drum.

3. Apparatus for molding an endless tractor track as set forth in claim 1 wherein, the drum is of aluminum construction.

4. Apparatus for molding an endless tractor track as set forth in claim 1 wherein, the mold includes a top provided with downwardly and outwardly inclined surfaces, and the outer matrices include upwardly and inwardly inclined surfaces, with the mold top being movable downwardly to exert inwardly compressive force upon the outer matrices whereby the uncured rubber is simultaneously heated and compressed to effect thorough curing thereof.

5. Apparatus for molding an endless tractor track as set forth in claim 2 wherein, the drum rim is defined by axially aligned halves, and which apparatus further includes:

a plurality of spokes;

an axle connected to the drum rim by the spokes; and fastening means removably connecting the rim halves with the spokes, whereby the spokes are disconnected from the rim halves to effect axial separation of the drum halves for removal of the molded tractor track from the drum rim halves.

6. Apparatus for molding an endless tractor track as set forth in claim 4 wherein, the drum rim is of axially separable construction to effect release of the cured tractor track from the rim.

7. Apparatus for molding an endless tractor track from a band of uncured rubber and calendered cord, wire cable, and a plurality of drive lugs, such apparatus comprising:

a rotatable building and curing drum formed with concentric inner and outer shells which define a circumferential space between such shells and with the outer peripheral surface of the outer shell defining a continuous rim;

such rim being formed with a plurality of peripherally spaced drive lug receiving cavities that releasably receive the drive lugs;

such peripheral rim surface defining an inner rubber molding matrix;

means for disposing a band of uncured rubber, calendered cord and wire cable onto the outer peripheral surface of the rim over the drive lugs;

a mold that removably receives the drum and the band of uncured rubber, calendered cord, wire cable, and drive lugs, the mold having a plurality of outer rubber molding matrices that are extended to admit the drum and retracted to release the drum;

means for heating the outer matrices;

means for introducing heated fluid into the space between the shells;

power-operated means for advancing the outer matrices into compressive contact with the uncured rubber, cord and wire cable between the outer matrices and the drum rim so as to cure the rubber and simultaneously bond the cord, cable and drive lugs to the rubber while forming integral treads on the outer portion of the rubber so as to form the endless tractor track; and means for introducing chilled fluid into the space between the shells to radially reduce the diameter of the rim by thermal contraction after the rubber has cured and thereby free the cured tractor track from the drum rim.

8. Apparatus for molding an endless tractor track as set forth in claim 7 wherein, the drum is of axially separable construction to effect removal of the cured tractor track from the drum.

9. Apparatus for molding an endless tractor track as set forth in claim 7, wherein the drum rim is formed of aluminum.

10. Apparatus for molding an endless tractor track as set forth in claim 8 wherein, the drum rim is defined by two axially aligned halves, and said apparatus further includes:

a plurality of spokes;

an axle connected to the drum rim by the spokes; and fastening means removably connecting the rim halves with the spokes whereby the spokes are disconnected from the rim halves to effect axial separation of the drum halves for removal of the molded tractor tracks from the drum rim halves.

11. Apparatus for molding an endless tractor track from a band of uncured rubber, calendered cord and wire cable, and a plurality of drive lugs, such apparatus comprising:

a curing drum having concentric inner and outer shells which define a circumferential space between such shells, and the outer peripheral surface of the outer shell defining a continuous rim, such drum rim also being formed with a plurality of peripherally spaced drive lug cavities which releasably receive the drive lugs;

means to releasably insert drive lugs into the drive lug cavities;

means to dispose a band of uncured rubber, calendered cord and wire cable onto the outer peripheral surface of the drum rim over the drive lugs;

means to initially introduce a heating fluid into the circumferential space between the drum shells to heat the drum rim to a rubber molding temperature;

a mold that removably receives the drum and its band of uncured rubber, calendered cord and wire cable, the mold having a plurality of tread forming outer matrices that are extended to admit the drum and retracted to release the drum;

means for supplying heated fluid to the outer matrices;

power-operated means to advance the heated outer matrices into compressive contact with the uncured rubber, cord and wire cable between the drum rim and outer matrices to cure the rubber thereby bonding the calendered cord, wire cable and drive lugs to the rubber and concurrently molding integral treads on the outer portion of the rubber so as to form the endless tractor track; and means to introduce chilled fluid within the circumferential space to thermally reduce the drum rim diameter after the rubber has cured and thereby free the cured tractor track from the drum.

12. Apparatus for molding an endless tractor track as set forth in claim 11 wherein, the drum is of axially separable construction to effect removal of the cured tractor track from the drum.

13. Apparatus for molding an endless tractor track as set forth in claim 11 wherein, the drum is of aluminum construction.

14. Apparatus for molding an endless tractor track as set forth in claim 11 wherein, the mold includes a top provided with downwardly and outwardly inclined surfaces, and the outer matrices include upwardly and inwardly inclined surfaces, with the mold top being movable downwardly to exert inwardly compressive force upon the outer matrices whereby the uncured rubber is simultaneously heated and compressed to effect thorough curing thereof.

15. Apparatus for molding an endless tractor track as set forth in claim 12 wherein, the drum rim is defined by axially aligned halves, and which apparatus further includes:

a plurality of spokes;

an axle connected to the drum rim by the spokes; and fastening means removably connecting the rim halves with the spokes, whereby the spokes are disconnected from the rim halves to effect axial separation of the drum halves for removal of the molded tractor track from the drum rim halves.

16. A method of forming an endless tractor track from layers of uncured rubber, calendered cord, wire cable, and a plurality of drive lugs, that includes the steps of:

providing a building and curing drum having a rim formed with a continuous peripheral surface and lug-receiving pockets arranged at peripherally spaced points on such surface;

positioning a plurality of drive lugs within the lug-receiving pockets, then depositing uncured rubber, calendered cord and wire cable on the rim surface over the drive lugs;

providing a heated segmented mold for curing the uncured rubber, such mold having outer tread forming matrices;

lowering the drum rim and its uncured rubber, calendared cord, wire cable, and drive lugs into the confines of the outer matrices;

heating the outer segments of the mold and the drum rim surface;

urging the heated outer matrices against the uncured rubber to compress and cure the rubber between the outer matrices and the rim's peripheral surface so as to bond the calendered cord, wire cable and drive lugs onto the rubber and concurrently form integral treads on the outer surface of the rubber;

raising the drum from within the mold;

thermally reducing the outer diameter of the drum rim by the introduction of a chilled fluid into the drum radially inward of the rim's peripheral surface; and removing the completed endless tractor track from the rim of the drum.

17. A method as set forth in claim 16 wherein the drum is formed of aluminum.

18. A method as set forth in claim 16 wherein the drum is rotated to position the drive lugs in the lug-receiving pockets and to deposit the uncured rubber, calendered cord and wire cable on the drum rim over the drive lugs.

19. A method as set forth in claim 16 wherein the drum is formed of axially separable parts and such parts are separated to remove the molded tractor track from the drum.

20. A method for molding an endless tractor track from a band of uncured rubber, calendered cord, wire cable, and a plurality of drive lugs that includes the steps of:

provoding a building and curing drum having a rim formed with continuous outer peripheral surface and a plurality of lug receiving apertures, such drum also including concentric inner and outer shells which define a space between such shells;

inserting drive lugs into the apertures;

then disposing uncured rubber, calendered cord and wire cable onto the outer peripheral surface of the drum rim and drive lugs within the apertures;

providing a mold that removably receives the drum and its uncured rubber, calendered cord, wire cable, and drive lugs, the mold having a plurality of rubber molding outer matrices formed with tread defining ribs and grooves;

extending the outer matrices to admit the drum;

heating the drum rim by introducing heated fluid into the space between the shells;

heating the outer matrices and advancing such outer matrices into compressive contact with the uncured rubber, cord and wire cable between the drum rim's peripheral surface and the outer matrices to form treads on the outer surface of the rubber and concurrently bond the lugs onto the rubber and thereby form the endless tractor track;

introducing chilled fluid into the space between the drum shells to radially reduce the rim of the drum by thermal contraction to thereby free the cured tractor track from the drum; and removing the cured tractor track from the drum.

21. A method as set forth in claim 20 wherein the drum is rotated to deposit the uncured rubber, calendered cord, wire cable, and drive lugs on the drum rim.

22. A method as set forth in claim 20 wherein the drum includes concentric inner and outer shells which define a circumferential space between the shells and the drum rim is heated by a heated fluid introduced into the space and cooled fluid is introduced into the space to effect thermal contraction of the rim.

* * * * *